T. J. DOWNER.
CENTRIPETAL ELECTRIC SWITCH.
APPLICATION FILED APR. 13, 1908.
925,312.
Patented June 15, 1909.
2 SHEETS—SHEET 1.
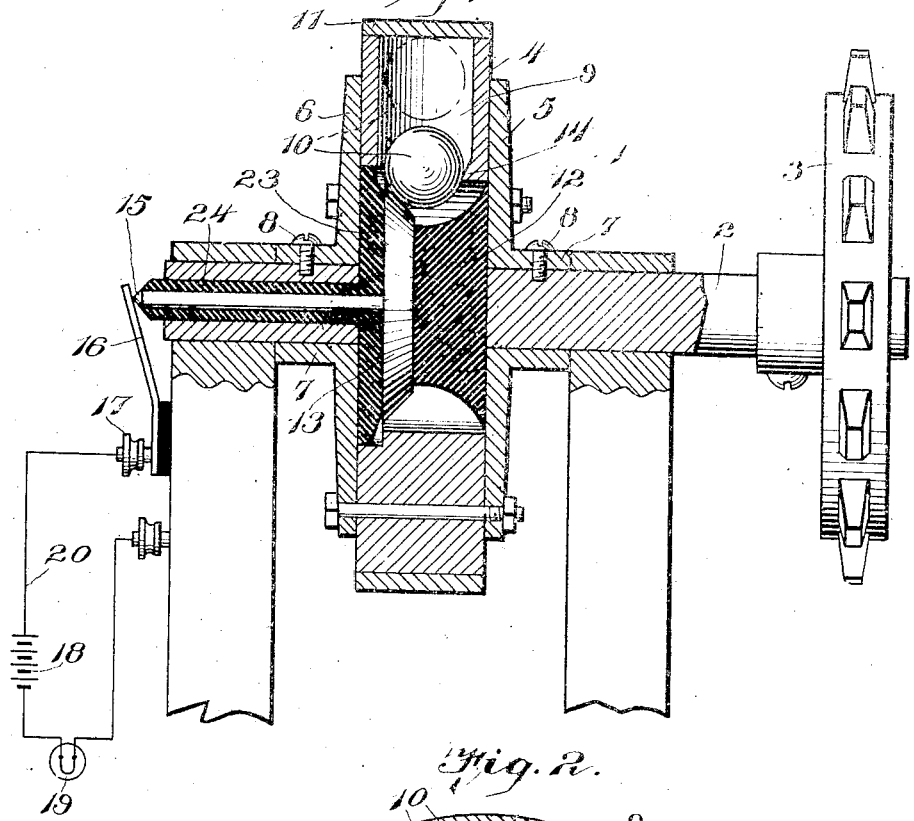
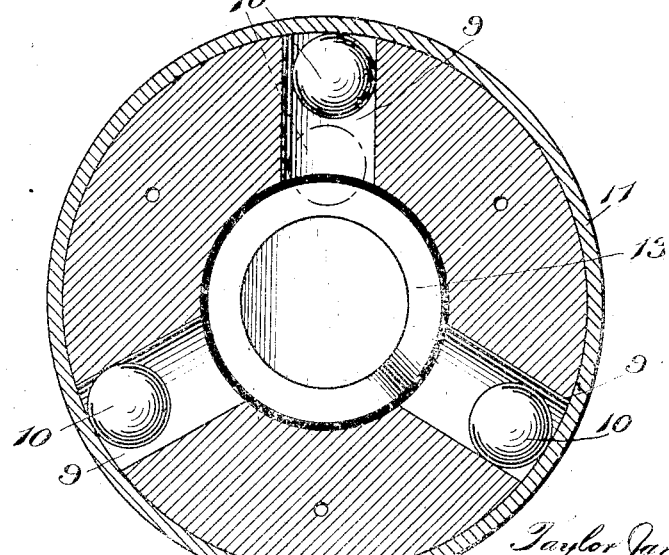

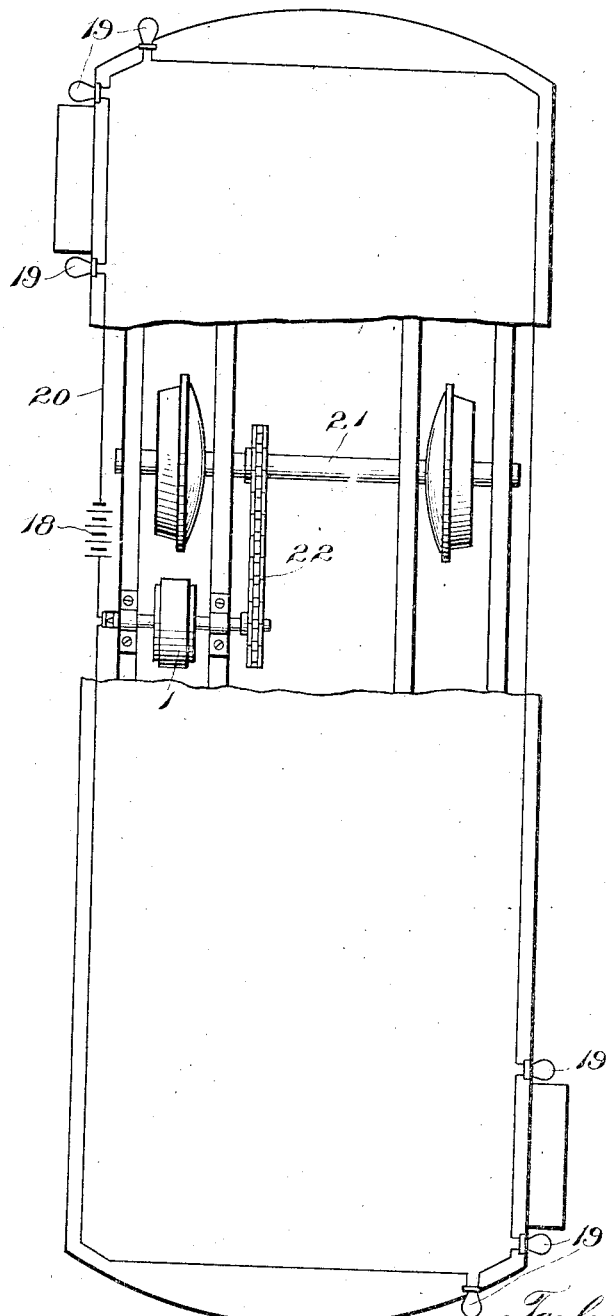

UNITED STATES PATENT OFFICE.

TAYLOR JAMES DOWNER, OF COLORADO SPRINGS, COLORADO.

CENTRIPETAL ELECTRIC SWITCH.

No. 925,312.   Specification of Letters Patent.   Patented June 15, 1909.

Application filed April 13, 1908. Serial No. 426,712.

*To all whom it may concern:*

Be it known that I, TAYLOR JAMES DOWNER, citizen of the United States, residing at Colorado Springs, in the county of El Paso and State of Colorado, have invented certain new and useful Improvements in Centripetal Electric Switches; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a circuit closer and has for its object to provide a device wherein an electric circuit is automatically broken by centrifugal force; and my invention is particularly adapted to be used on vehicles such as cars, automobiles or the like, and is so constructed and arranged that it can be quickly and easily attached to the rotating part of the vehicle.

A further object of my invention is to provide a centrifugal circuit closer which is simple in construction, easy and cheap to manufacture, strong, durable and efficient, comprising no springs or other frail and uncertain mechanism.

When utilizing this device on vehicles or the like certain audible or visible signals are arranged in the circuit in such manner that they will be operated when the force of gravity overcomes the centrifugal force, thus sounding the audible signal or lighting the visible signal such as a lamp. The functions of said signals are many and varied; as for instance when applying the device to a car carrying passengers, one or more visible signals can be arranged in close proximity to the steps of the car, and a visible signal can be arranged on the back of the car in such manner that when the car slows down or comes to a stop the visible signals in close proximity to the steps will illuminate the steps in order to enable passengers to alight from and board the car at night with greater safety and more despatch; while the visible signal in the rear of the car will warn the next following car or other vehicles, indicating instantly that the car is either running very slow or has come to a stop. It is of course evident that an audible signal can be employed also in this capacity, while the same may be said of motor vehicles such as automobiles or the like.

My invention is also adapted to be used in connection with machinery of various kinds, and when attached to or associated with a rotating part thereof a visible or audible signal can be given indicating stoppage of any part or parts of the machinery, or to indicate any slow down in the same. It is apparent that my device is also applicable for other purposes.

With these objects in view my invention consists in the novel construction and arrangement of parts of the circuit closer as will be first fully described and afterward specifically pointed out in the appended claims.

Referring to the accompanying drawings: Figure 1 is a transverse sectional view through the circuit closer. Fig. 2 is a vertical sectional view through the same, and Fig. 3 is a diagrammatic view showing the device applied to a passenger coach.

Like numerals of reference indicate the same parts throughout the several figures in which;

1 indicates the circuit closer which comprises the shaft 2 carrying a sprocket 3 or a grooved pulley or any other suitable element for transmitting the rotary motion to the circuit closer.

4 indicates the revoluble member which (as shown in Fig. 1) is attached to the shaft 2, said revoluble member 4 comprising two face plates 5 and 6, said plates being provided with a collar 7 which is secured to the shaft 2 by means of a screw 8, as shown in Fig. 1, or the plates may be keyed on the shaft or otherwise suitably secured thereon.

Referring now to Fig. 2 it will be seen that the revoluble member 4 is provided with preferably three radially disposed chambers 9 preferably circular in cross section in order to accommodate a suitable metallic ball 10 in each of the chambers 9, while I provide a band or rim 11 closing the chambers 9 and retaining the metallic balls 10 therein.

Referring now to Fig. 1 it will be seen that the central portion 12 of the revoluble member 4 is constructed of insulating or non-conducting material, while I provide within the revoluble member 4 a beveled bearing 13 as clearly shown in Fig. 1, said bearing 13 receiving the metallic balls 10 as shown. It will also be seen from Fig. 1 that at the inner end of the chambers 9 I provide a slight lug or extension 14 against which the metallic ball 10 rests when in operative position. Connected to the beveled bearing 13 or formed integral therewith is a metallic shaft or pin 15, the outer end of which is normally in engagement with a spring contact 16, said spring contact having a binding post 17 associated therewith as clearly shown in Fig. 1.

Referring to Fig. 3 which illustrates the device applied to a passenger coach it will be seen that 18 indicates a source of current, 19 the electric lamps and 20 the circuit. It will also be seen that the device is geared to one of the axles 21 by means of a sprocket chain 22.

Having thus described the several parts of my invention its operation is as follows: The circuit closer to be geared or otherwise connected to the rotating part of the vehicle or other machine and rotating therewith, each of the metallic balls 10 within the chamber 9 are by centrifugal force carried into position, shown in Fig. 2, and are maintained in said position as long as the rotation of the device allows centrifugal force to overcome the force of gravity upon the metallic balls 10. As soon, however, as the rotation of the device is lessened to the extent that the force of gravity overcomes the centrifugal force acting on the metallic balls 10, then one or more of said balls 10 will be carried into position shown in full lines in Fig. 1 and in dotted lines in Fig. 2, in which position the ball resting upon the beveled bearing 13 and the small lug or projection 14 closes the circuit, thereby operating the signals. It is clearly evident from Fig. 2 that no matter what position the rotating member 4 may assume at least one of the metallic balls 10 must be dropped into engagement with the bearing 13 and lug or projection 14 as shown in Fig. 1. While the device is rotating at slow speed one or more of the balls 10 being in position shown in Fig. 1 closes the circuit and maintains same closed until the revolutions cause centrifugal force acting on the balls 10 to overcome the force of gravity thereon which carries the balls into position shown in Fig. 2 instantly breaking the circuit and cutting out the signals. When the device comes to a stop suddenly or gradually one or more of the balls 10 will take the position shown in Fig. 1 thus closing the circuit and operating the signals.

It will be seen from Fig. 1 that the beveled bearing 13 and metallic shaft 15 are insulated from the revoluble member by means of an insulating disk 23 and an insulating bushing 24 around the pin or shaft 15.

Having thus fully described my invention and operation thereof what I claim as new and desire to secure by Letters Patent of the United States, is;—

A circuit closer comprising a revoluble shaft, a revoluble member carried on and rotated by said revoluble shaft, said revoluble member being provided with a series of radially disposed chambers, a member of electrical conducting material loosely carried in each of said radially disposed chambers, an electrical contact piece at the inner end of said radially disposed chambers and arranged in the path of said loosely carried members, said contact piece being electrically connected to the said revoluble shaft, an electrical contact piece at the inner end of said radially disposed chambers and in the path of said loosely carried members, the last mentioned contact piece being insulated from the said revoluble shaft, each of said loosely carried members being adapted to engage both of said electrical contacts to close an electric circuit.

In testimony whereof, I have affixed my signature, in presence of two witnesses.

TAYLOR JAMES DOWNER.

Witnesses:
WENDELL BURR PRICE,
CLARENCE ALBERT FLEMING.